United States Patent
Sims et al.

(10) Patent No.: US 10,313,344 B2
(45) Date of Patent: Jun. 4, 2019

(54) INTERNAL FOOTPRINT REPOSITORY

(71) Applicant: Bank of America Corporation, Charlotte, NC (US)

(72) Inventors: Scott A. Sims, Tega Cay, SC (US); Alex Stapleton, Woodstock, GA (US); Andrew Kim, Glendale, AZ (US); Kolt Bell, Charlotte, NC (US); Youshika Scott, Charlotte, NC (US); Jeff Zusi, Charlotte, NC (US); Nicole Ryan, Newark, DE (US); Craig Widmann, Chandler, AZ (US); Brian Corr, Charlotte, NC (US); Alvino Sarran, Nashville, TN (US)

(73) Assignee: Bank of America Corporation, Charlotte, NC (US)

( * ) Notice: Subject to any disclaimer, the term of this patent is extended or adjusted under 35 U.S.C. 154(b) by 280 days.

(21) Appl. No.: 15/474,225

(22) Filed: Mar. 30, 2017

(65) Prior Publication Data

US 2018/0288043 A1 Oct. 4, 2018

(51) Int. Cl.
*H04L 29/06* (2006.01)

(52) U.S. Cl.
CPC ........ *H04L 63/0876* (2013.01); *H04L 63/102* (2013.01)

(58) Field of Classification Search
CPC .... H04L 63/0876; H04L 63/102; H04L 29/06
USPC .......................................................... 726/7
See application file for complete search history.

(56) References Cited

U.S. PATENT DOCUMENTS

| | | | |
|---|---|---|---|
| 7,606,580 B2 | 10/2009 | Granito et al. | |
| 8,019,678 B2 | 9/2011 | Wright et al. | |
| 8,973,096 B1 | 3/2015 | Villa et al. | |
| 9,003,196 B2 * | 4/2015 | Hoyos ................ | H04L 63/10 713/186 |
| 9,185,095 B1 | 11/2015 | Moritz et al. | |

(Continued)

OTHER PUBLICATIONS

"Device Fingerprint," from Wikipedia, the free encyclopedia, accessed Mar. 30, 2017, from https//en.wikipedia.org/wiki/Device_fingerprint, 4 pages.

(Continued)

*Primary Examiner* — Evans Desrosiers
(74) *Attorney, Agent, or Firm* — Banner & Witcoff, Ltd.; Michael A. Springs

(57) ABSTRACT

Aspects of the disclosure relate to a system to monitor devices for unauthorized access of an external account. A computing platform may receive, via a communication interface, and from a first user device, metadata comprising first user device identification information and accessed account information. The computing platform may determine, based on the first user device identification information, whether the first user device is one of a plurality of internal user devices. The computing platform may identify, based on the accessed account information, an action indicating the first user device is accessing an account. The computing platform may determine, based on the action and the accessed account information, whether the action is authorized. The computing platform may receive information indicating unauthorized use of the account by the first user device. The computing platform may transmit the information indicating unauthorized use of the account by the first user device.

20 Claims, 9 Drawing Sheets

(56) References Cited

U.S. PATENT DOCUMENTS

| | | | |
|---|---|---|---|
| 9,197,999 B2 | 11/2015 | Granito et al. | |
| 9,218,574 B2 | 12/2015 | Phillipps et al. | |
| 9,324,022 B2 | 4/2016 | Williams, Jr. et al. | |
| 9,516,053 B1 | 12/2016 | Muddu et al. | |
| 9,536,072 B2 | 1/2017 | Guedalia et al. | |
| 2010/0107225 A1* | 4/2010 | Spencer | H04L 63/0876 726/4 |
| 2011/0055913 A1* | 3/2011 | Wong | H04L 63/08 726/9 |
| 2014/0205990 A1 | 7/2014 | Wellman et al. | |
| 2017/0061728 A1 | 3/2017 | Cannon et al. | |
| 2017/0063848 A1 | 3/2017 | Collinge et al. | |
| 2017/0063948 A1 | 3/2017 | Shroff et al. | |
| 2017/0068792 A1 | 3/2017 | Reiner | |
| 2017/0068947 A1 | 3/2017 | Xie et al. | |
| 2017/0068954 A1 | 3/2017 | Hockey et al. | |
| 2017/0069014 A1 | 3/2017 | Minelli | |
| 2017/0069162 A1 | 3/2017 | Williams et al. | |
| 2017/0070395 A1 | 3/2017 | Ansari et al. | |
| 2017/0070484 A1 | 3/2017 | Kruse et al. | |
| 2017/0070500 A1 | 3/2017 | Hockey et al. | |
| 2017/0070889 A1 | 3/2017 | Huber et al. | |
| 2017/0075727 A1 | 3/2017 | Cropper et al. | |
| 2017/0075728 A1 | 3/2017 | Cropper et al. | |
| 2017/0076066 A1 | 3/2017 | Adams et al. | |
| 2017/0076279 A1 | 3/2017 | Pebbles et al. | |
| 2017/0076518 A1 | 3/2017 | Patterson et al. | |
| 2017/0076520 A1 | 3/2017 | Ho et al. | |
| 2017/0076522 A1 | 3/2017 | Ives-Halperin et al. | |
| 2017/0076556 A1 | 3/2017 | Walker et al. | |
| 2017/0078022 A1 | 3/2017 | Masarik et al. | |
| 2017/0078154 A1 | 3/2017 | Ansari et al. | |
| 2017/0078723 A1 | 3/2017 | Rao | |
| 2017/0078922 A1 | 3/2017 | Raleigh et al. | |
| 2017/0081796 A1 | 3/2017 | Belveal et al. | |
| 2017/0082991 A1 | 3/2017 | Belveal et al. | |
| 2017/0083928 A1 | 3/2017 | Gerard et al. | |
| 2017/0083989 A1 | 3/2017 | Brockman et al. | |
| 2017/0085390 A1 | 3/2017 | Belveal et al. | |
| 2017/0085589 A1 | 3/2017 | Rizzo et al. | |
| 2017/0085724 A1 | 3/2017 | Sharma et al. | |
| 2017/0086050 A1 | 3/2017 | Kerning et al. | |
| 2017/0086066 A1 | 3/2017 | Mohajeri | |
| 2017/0091430 A1 | 3/2017 | Lemelev et al. | |
| 2017/0091464 A1 | 3/2017 | Richards et al. | |
| 2017/0091764 A1 | 3/2017 | Lloyd et al. | |
| 2017/0091765 A1 | 3/2017 | Lloyd et al. | |
| 2017/0091772 A1 | 3/2017 | Piel et al. | |
| 2017/0091774 A1 | 3/2017 | White | |
| 2017/0091856 A1 | 3/2017 | Canberk et al. | |
| 2017/0091863 A1 | 3/2017 | Russell et al. | |
| 2017/0092054 A1 | 3/2017 | Petersen et al. | |
| 2017/0092059 A1 | 3/2017 | Nelson | |
| 2017/0093581 A1 | 3/2017 | Roth et al. | |
| 2017/0094513 A1 | 3/2017 | Kelts et al. | |
| 2017/0094514 A1 | 3/2017 | Kelts et al. | |
| 2017/0094519 A1 | 3/2017 | Salyers et al. | |
| 2017/0094520 A1 | 3/2017 | Salyers et al. | |
| 2017/0094521 A1 | 3/2017 | Salyers et al. | |
| 2017/0094534 A1 | 3/2017 | Salyers et al. | |

OTHER PUBLICATIONS

"Web analytics," from Wikipedia, the free encyclopedia, accessed Mar. 30, 2017, from https//en.wikipedia.org/wiki/Web_analytics, 11 pages.

"Click fraud," from Wikipedia, the free encyclopedia, accessed Mar. 30, 2017, from https//en.wikipedia.org/wiki/Click_fraud, 7 pages.

* cited by examiner

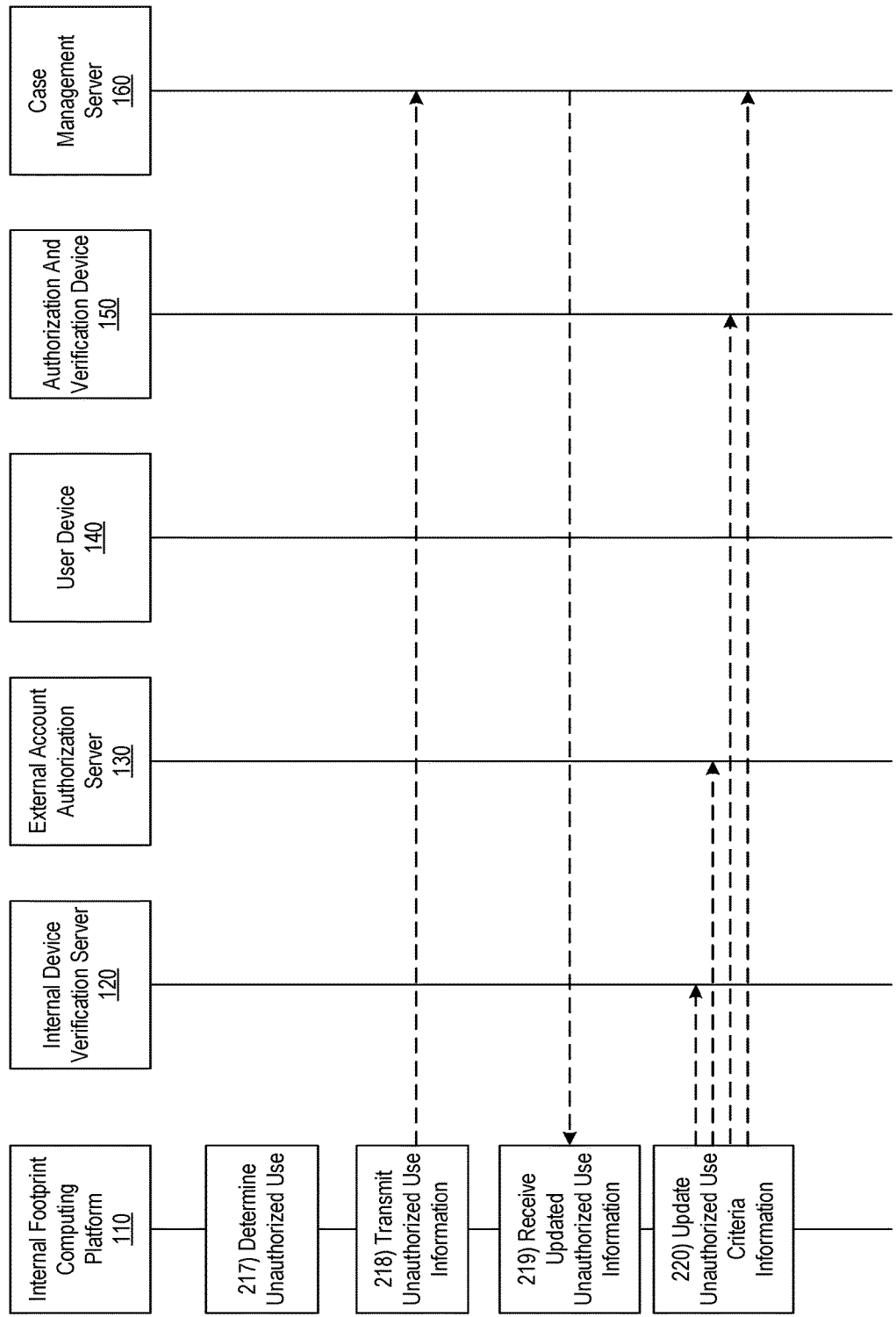

INTERNAL FOOTPRINT REPOSITORY

BACKGROUND

Aspects of the disclosure relate to electrical computers, digital processing systems, and multicomputer data transferring. In particular, one or more aspects of the disclosure relate to utilizing digital processing systems and multicomputer data transferring to provide an internal footprint repository.

Organizations may provide their associates with user devices to perform organization-related functions on behalf of the organization. Additionally, associates may desire to perform organization-related functions using their own user devices, for instance, based on a bring-your-own-device (BYOD) model. As the abundance of different user devices and platforms to perform organization-related functions evolves, organizations find it more difficult to monitor and maintain which user devices are performing organization-related functions on behalf of the organization. Further, it may prove difficult to store and maintain these user devices that are involved in performing organization-related functions. Thus, it may be beneficial to create and monitor an associate's user devices when performing organization-related functions.

SUMMARY

Aspects of the disclosure provide effective, efficient, scalable, and convenient technical solutions that address and overcome the technical problems associated with deploying and utilizing a device monitoring system to prevent unauthorized access to an external user account. In particular, one or more aspects of the disclosure provide techniques for preventing unauthorized access to an external user account using an internal footprint repository.

In accordance with one or more embodiments, a computing platform having at least one processor, a memory, and a communication interface may receive, by the at least one processor, via the communication interface, and from a first user device, metadata comprising first user device identification information and accessed account information. Subsequently, the computing platform may generate, based on the first user device identification information, one or more commands directing an internal device verification server to determine whether the first user device is one of a plurality of internal devices. Thereafter, the computing platform may transmit, via the communication interface and to the internal device verification server, the one or more commands directing the internal device verification server to determine whether the first user device is the one of the plurality of internal devices. Then, the computing platform may receive, via the communication interface and from the internal device verification server, internal device verification information indicating the first user device is the one of the plurality of internal devices. Subsequently, the computing platform may, in response to receiving the internal device verification information, identify, based on the accessed account information, an action indicating the first user device accessed an account. Next, the computing platform may generate, based on the action and the accessed account information, one or more commands directing an external account authorization server to determine whether the action is authorized. Then, the computing platform may transmit, via the communication interface and to the external account authorization server, the one or more commands directing the external account authorization server to determine whether the action is authorized. Afterwards, the computing platform may receive, via the communication interface and from the external account authorization server, information indicating unauthorized use of the account by the first user device. Subsequently, the computing platform may transmit, via the communication interface and to a case management server, the information indicating unauthorized use of the account by the first user device.

In some embodiments, the computing platform may receive, by the at least one processor, via the communication interface, and from an authorization device, information corresponding to the plurality of internal devices. Subsequently, the computing platform may transmit, via the communication interface and to the internal device verification server, the information corresponding to the plurality of internal devices and the first user device identification information.

In some embodiments, in generating one or more commands directing the internal device verification server to determine whether the first user device is the one of the plurality of internal devices, the computing platform may determine, based on a comparison of the first user device identification information with the information corresponding to the plurality of internal devices, the internal device verification information indicating the first user device is the one of the plurality of internal devices. Afterwards, the computing platform may transmit the internal device verification information.

In some embodiments, the first user device identification information may comprise mobile cookie information indicating at least one mobile cookie corresponding to the first user device. In some embodiments, the first user device identification information may comprise geolocation information indicating a geolocation corresponding to the first user device. In some embodiments, the first user device identification information may comprise time zone information indicating a time zone corresponding to the first user device. In some embodiments, the first user device identification information may comprise device print information indicating a device print corresponding to the first user device. In some embodiments, the first user device identification information may comprise virtual private network information indicating a virtual private network corresponding to the first user device. In some embodiments, the first user device identification information may comprise internet protocol information indicating an internet protocol corresponding to the first user device.

In some embodiments, the first user device identification information may comprise the first user identification information. Subsequently, the information corresponding to the plurality of internal devices may comprise information corresponding to associates of an organization.

In some embodiments, the computing platform may receive, by the at least one processor, via the communication interface, and from an authorization device, information corresponding to a plurality of external accounts. Subsequently, the computing platform may transmit, via the communication interface and to the internal device verification server, the information corresponding to the plurality of external accounts and the accessed account information.

In some embodiments, in generating one or more commands directing the external account authorization server to determine whether the action is authorized, the computing platform may determine, based on the account the first user device is accessing and the information corresponding to the plurality of external accounts, the information indicating unauthorized use of the account by the first user device.

Afterwards, the computing platform may transmit the information indicating unauthorized use of the account by the first user device.

In some embodiments, in generating one or more commands directing the external account authorization server to determine whether the action is authorized, the computing platform may determine, based on the account the first user device is accessing and the information corresponding to the plurality of external accounts, an amount of accounts accessed by the first user device over a period of time. Subsequently, the determining the information indicating unauthorized use of the account by the first user device may be based on the amount of accounts accessed by the first user device over the period of time.

In some embodiments, in generating one or more commands directing the external account authorization server to determine whether the action is authorized, the computing platform may determine, based on the account the first user device is accessing and the information corresponding to the plurality of external accounts, an address corresponding to the first user device and an address corresponding to the account accessed by the first user device. Subsequently, the determining the information indicating unauthorized use of the account by the first user device may be based the address corresponding to the first user device and the address corresponding to the account accessed by the first user device.

In some embodiments, the determining the information indicating unauthorized use of the account by the first user device may be based on the action indicating the first user device is accessing the account.

In some embodiments, the information corresponding to the plurality of external accounts may comprise information corresponding to a plurality of event actions corresponding to the account accessed by the first user device. Subsequently, the determining the information indicating unauthorized use of the account by the first user device may be based on the plurality of event actions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, and 2E depict an illustrative event sequence for preventing unauthorized access to an external user account using an internal footprint repository;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to techniques for preventing unauthorized access to an external user account using an internal footprint repository in an infrastructure environment, which may be challenging because of dynamic changes in the environment that occur on a routine basis. Environments with logic resolution workflows may help to address sets of issues and keep a particular environment at an optimally configured level. However, it may be a challenge to characterize and identify a particular workflow as a static model for further configurations. In accordance with some aspects of the disclosure, a set of optimal specifications may be inferred from a dynamic analysis of outputs, observations, and/or records. Using information associated with a typical execution archetype of resolution techniques, a learned workflow may be filtered to optimally configure system parameters, reduce false positives, and/or model symbolic input to identify refined set point paths that are likely to represent ideal system conditions. To deal with variants, original rule sets may be identified from derived rule sets based on delta improvements. To systematically analyze a logic sequence of workflows, a system implementing one or more aspects of the disclosure may model all possible downstream interactions with systems and/or applications. In addition, the system may map all entry points to the system, various applications, and/or possible trails of execution, which may be validated and/or identified with the most optimal entry points.

Figure 1A:
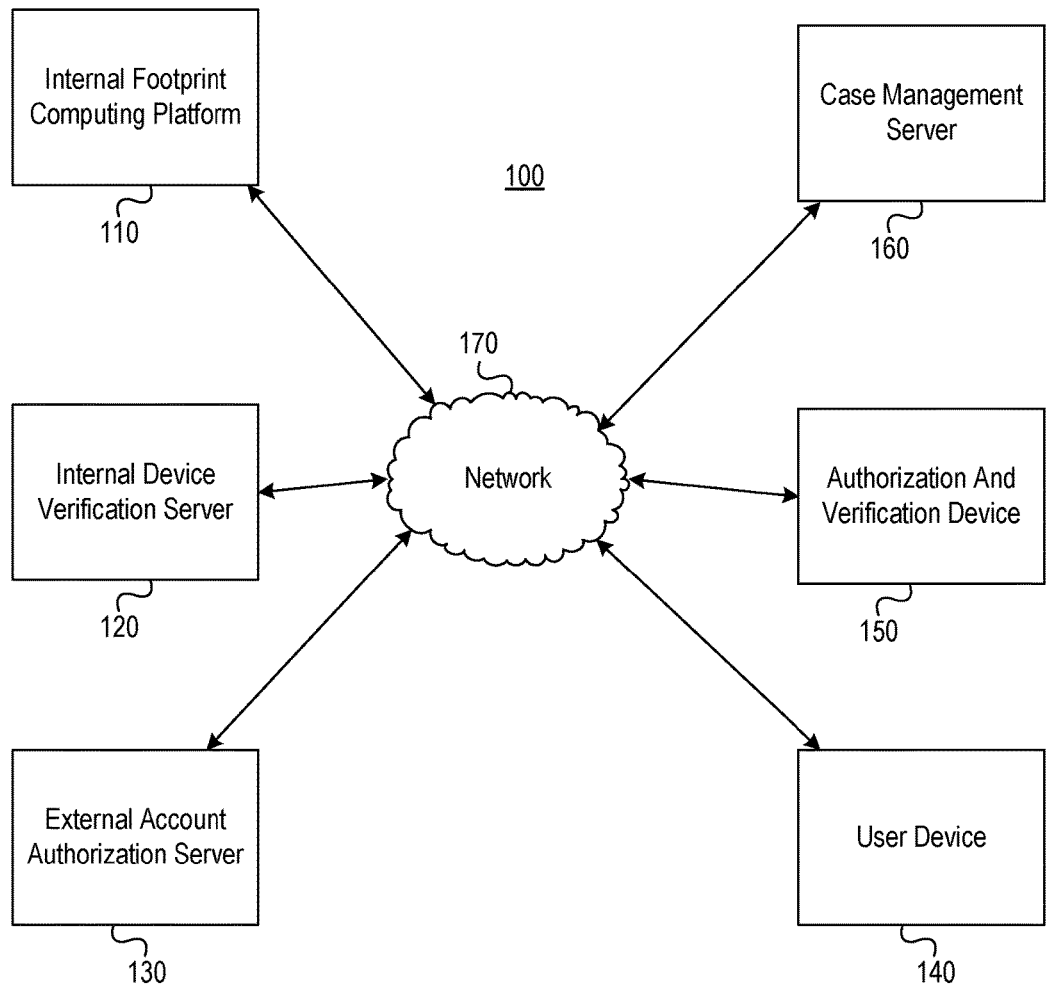
FIGS. 1A and 1B depict an illustrative computing environment for preventing unauthorized access to an external user account using an internal footprint repository.
Figure 1B:
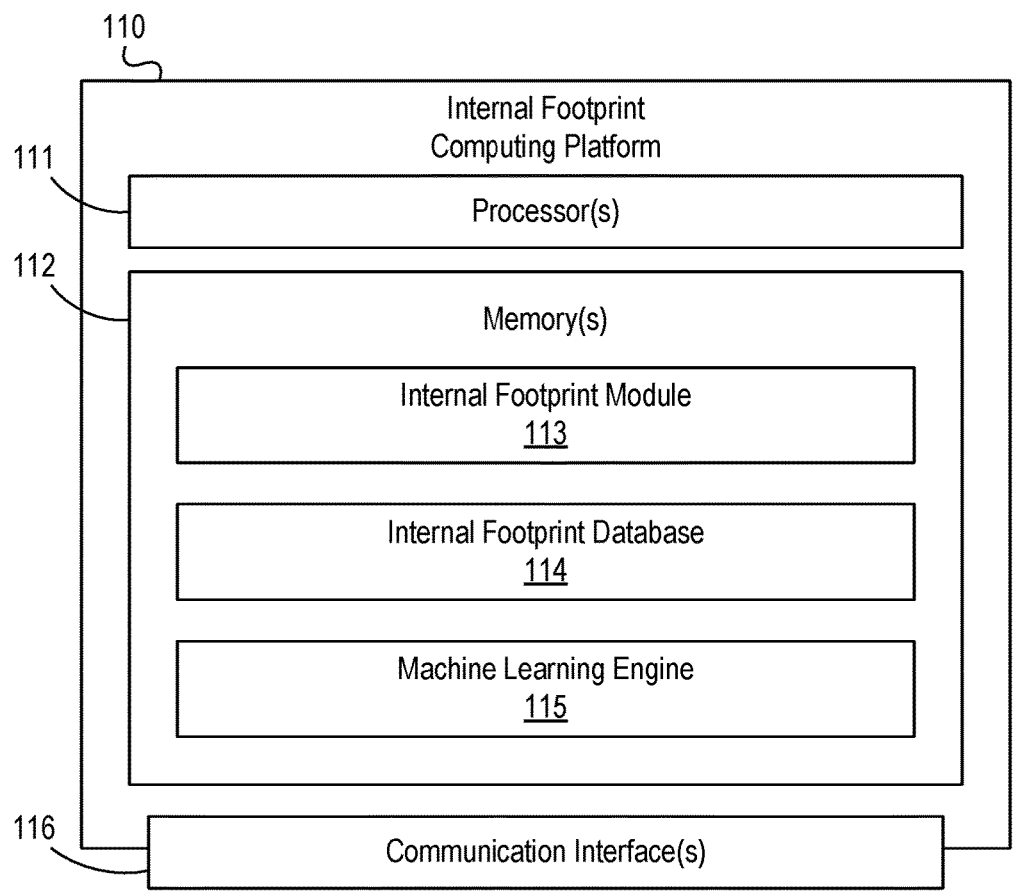

FIGS. 1A and 1B depict an illustrative computing environment for preventing unauthorized access to an external user account using an internal footprint repository in accordance with one or more example embodiments. Referring to FIG. 1A, computing environment 100 may include one or more computing devices and/or other computer systems. For example, computing environment 100 may include an internal footprint computing platform 110, an internal device verification server 120, an external account authorization server 130, a user device 140, an authorization and verification device 150, and a case management server 160.

Internal footprint computing platform 110 may be configured to monitor devices for unauthorized access of an external account by controlling and/or directing actions of other devices and/or computer systems, and/or perform other functions, as discussed in greater detail below. In some instances, internal footprint computing platform 110 may perform and/or provide one or more techniques to monitor devices for unauthorized access of an external account.

Internal device verification server 120 may be configured to store and/or maintain internal device information, which may be used in monitoring devices for unauthorized access of an external account. For example, internal device verification server 120 may be configured to store and/or maintain information corresponding to internal devices, information corresponding to associates within an organization, and/or information corresponding to mobile cookies, geolocation, time zones, device prints, virtual private networks (VPNs), and/or internet protocol addresses (IP addresses). Additionally, or alternatively, internal device verification server 120 may be configured to receive information corresponding to a plurality of internal devices and/or one or more commands from the internal footprint computing platform 110, transmit internal device verification information to the internal footprint computing platform 110, update internal device verification information, communicate by receiving and/or sending information with the external account authorization server 130, the user device 140, the authorization and verification device 150, the case management server 160 (e.g. based on one/or more commands from the internal footprint computing platform 110), and/or perform other functions, as illustrated below. In some instances, the internal device verification server 120 might not be another entity, but the functionalities of the internal device verification server 120 may be included within the internal footprint computing platform 110.

External account authorization server 130 may be configured to store and/or maintain external account information to monitor devices for unauthorized access of an external account. For example, external account authorization server 130 may be configured to store and/or maintain information corresponding to external accounts, information corresponding to unauthorized use of an account, and/or information corresponding to an amount of accounts accessed by a user device over a period of time. Additionally, or alternatively, external account authorization server 130 may be configured to receive information corresponding to the plurality of external accounts and/or one or more commands from the internal footprint computing platform 110, transmit information corresponding to unauthorized use of the external account to the internal footprint computing platform 110, update external account authorization information, communicate by receiving and/or sending information with the internal device verification server 120, the user device 140, the authorization and verification device 150, the case management server 160 (e.g. based on one/or more commands from the internal footprint computing platform 110), and/or perform other functions, as illustrated below. In some instances, the external account authorization server 130 might not be another entity, but the functionalities of the external account authorization server 130 may be included within the internal footprint computing platform 110.

User device 140 may be configured to be used by one or more users of computing environment 100. For example, the user device 140 may be configured to provide one or more user interfaces that enable the one or more users and/or associates to access an account and/or perform organization-related functions on behalf of the organization. The user device 140 may receive, from the one or more users, user input or selections and send the user input or selections to the internal footprint computing platform 110 and/or one or more other computer systems and/or devices in computing environment 100. The user device 140 may receive, from the internal footprint computing platform 110 and/or one or more other computer systems and/or devices in computing environment 100, information or data in response to the user input or selection.

Authorization and verification device 150 may be configured to be used by one or more users of computing environment 100. For example, the authorization and verification device 150 may be configured to provide one or more user interfaces that enable a user (e.g., an administrator) to monitor unauthorized use or access of an account by a user device (e.g., the user device 140). The authorization and verification device 150 may receive, from the one or more users, user input or selections and send the user input or selections to the internal footprint computing platform 110 and/or one or more other computer systems and/or devices in computing environment 100. The authorization and verification device 150 may receive, from the internal footprint computing platform 110 and/or one or more other computer systems and/or devices in computing environment 100, information or data in response to the user input or selection.

Case management server 160 may be a computing device configured to offer any desired service, and may run various languages and operating systems. For example, case management server 160 may store information to assist in monitoring devices for unauthorized access of an external account. Case management server 160 may provide one or more interfaces that allow communications with other systems (e.g., internal footprint computing platform 110, internal device verification server 120, external account authorization server 130, user device 140, and/or authorization and verification device 150) in computing environment 100. In some instances, case management server 160 may receive, from the internal footprint computing platform 110, requests for information, transmit, to the internal footprint computing platform 110, requested information, receive, from the internal footprint computing platform 110, commands, execute commands received from the internal footprint computing platform 110, and/or perform other functions, as discussed in greater detail below.

In one or more arrangements, internal device verification server 120, external account authorization server 130, user device 140, authorization and verification device 150, and case management server 160 may be any type of computing device capable of providing a user interface, receiving input via the user interface, and communicating the received input to one or more other computing devices. For example, internal device verification server 120, external account authorization server 130, user device 140, authorization and verification device 150, and case management server 160 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal device verification server 120, external account authorization server 130, user device 140, authorization and verification device 150, and case management server 160 may, in some instances, be special-purpose computing devices configured to perform specific functions.

Computing environment 100 also may include one or more computing platforms. For example, and as noted above, computing environment 100 may include the internal footprint computing platform 110. As illustrated in greater detail below, the internal footprint computing platform 110 may include one or more computing devices configured to perform one or more of the functions described herein. For example, the internal footprint computing platform 110 may include one or more computers (e.g., laptop computers, desktop computers, servers, server blades, or the like).

Computing environment 100 also may include one or more networks, which may interconnect one or more of internal footprint computing platform 110, internal device verification server 120, external account authorization server 130, user device 140, authorization and verification device 150, and case management server 160. For example, computing environment 100 may include network 170. Network 170 may include one or more sub-networks (e.g., local area networks (LANs), wide area networks (WANs), or the like). For example, network 170 may include a private sub-network that may be associated with a particular organization (e.g., a corporation, financial institution, educational institution, governmental institution, or the like) and that may interconnect one or more computing devices associated with the organization. For example, internal footprint computing platform 110, internal device verification server 120, external account authorization server 130, user device 140, authorization and verification device 150, and case management server 160 may be associated with an organization, and a private sub-network included in network 170 and associated with and/or operated by the organization may include one or more networks (e.g., LANs, WANs, virtual private networks (VPNs), or the like) that interconnect internal footprint computing platform 110, internal device verification server 120, external account authorization server 130, user device 140, authorization and verification device 150, and case management server 160. Network 170 also may include a public sub-network that may connect the private sub-network and/or one or more computing devices connected thereto (e.g., internal footprint computing platform 110, internal device verification server 120, external account authorization server 130, user device 140, authorization and verification device 150, and case management server 160) with one or more networks and/or computing devices that are not associated with the organization.

Referring to FIG. 1B, internal footprint computing platform 110 may include one or more processors 111, memory 112, and communication interface 116. A data bus may interconnect processor(s) 111, memory 112, and communication interface 116. Communication interface 116 may be a network interface configured to support communication between internal footprint computing platform 110 and one or more networks (e.g., network 170). Memory 112 may include one or more program modules having instructions that when executed by processor(s) 111 cause the internal footprint computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the internal footprint computing platform 110 and/or by different computing devices that may form and/or otherwise make up internal footprint computing platform 110. For example, memory 112 may have, store, and/or include an internal footprint module 113, an internal footprint database 114, and a machine learning engine 115. Internal footprint module 113 may have instructions that direct and/or cause internal footprint computing platform 110 to monitor devices for unauthorized access of an external account, as discussed in greater detail below. Internal footprint database 114 may store information used by the internal footprint module 113 and/or the internal footprint computing platform 110 in monitoring devices for unauthorized access of an external account and/or in performing other functions. Machine learning engine 115 may have instructions that direct and/or cause the internal footprint computing platform 110 to set, define, and/or iteratively redefine optimization rules, techniques and/or other parameters used by internal footprint computing platform 110 and/or other systems in computing environment 100 in an internal footprint repository.

Figure 2A:
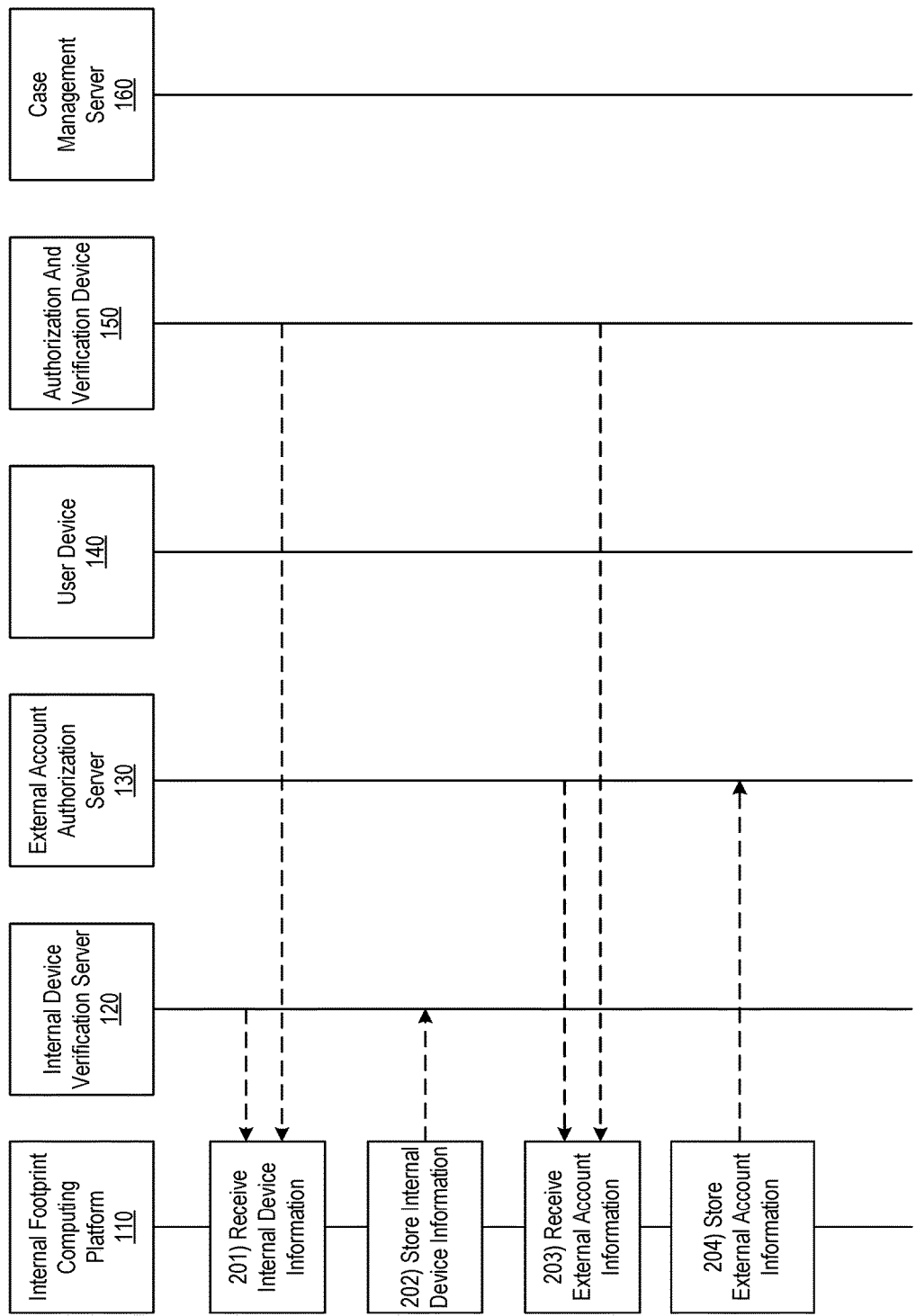

FIGS. 2A, 2B, 2C, 2D, and 2E depict an illustrative event sequence for preventing unauthorized access to an external user account using an internal footprint repository in accordance with one or more example embodiments. Referring to FIG. 2A, at step 201, internal footprint computing platform 110 may receive internal device information. For example, at step 201, internal footprint computing platform 110 may receive, via the communication interface (e.g., communication interface 116), from a server (e.g., internal device verification server 120) or a device (e.g., authorization and verification device 150), information corresponding to a plurality of internal devices. Internal devices may be any device (e.g., server computers, desktop computers, laptop computers, tablet computers, or smart phones) used by an associate to perform organization-related functions on behalf of an organization (e.g., a corporation, financial institution, educational institution, governmental institution, or the like). The internal devices may be connected to the network 170. In some instances, internal footprint computing platform 110 may determine, based on the factors explained below, that user device 140 is an internal device, for example. The organization may host and/or otherwise provide one or more networks (e.g., LANs, WANs, virtual private networks [VPNs], or the like) that interconnect the internal devices. In some examples, the internal devices may be connected to a private sub-network that may be associated with a particular organization and that may interconnect an internal device to one or more other internal devices associated with the organization. In some examples, the network 170 also may include a public sub-network that may connect the private sub-network and/or one or more of the internal devices with one or more networks and/or computing devices that are not associated with the organization.

In some examples, an organization may provide an associate with a device (e.g., desktop computers or laptop computers) to perform organization-related functions (e.g., accessing an account). In some instances, associates may also own a personal device that may be used for personal reasons and may also be used to perform organization-related functions. In some embodiments, a user (e.g., a client), not employed with the organization, may use a device to access an account managed by the organization.

In some instances, an organization may track and/or maintain information indicating and/or otherwise corresponding to whether a device (e.g., a device provided by the organization, an associate's own personal device, or a client's user device) is an internal device (e.g., a device used by an associate). The information corresponding to the plurality of internal devices, as explained in more detail below, may be any information related to determining whether a device is an internal device.

The internal footprint computing platform 110 may receive internal device information from the internal device verification server 120 and/or authorization and verification device 150. The authorization and verification device 150 may transmit information corresponding to the plurality of internal devices when a new associate begins employment with the organization or when a new internal device is registered by an administrator. In some examples, the internal footprint computing platform 110 may receive information corresponding to a new internal device provided by an organization to the new associate and/or the information corresponding to a personal device associated with the new associate. In some examples, a new internal device may be used by multiple associates. An administrator, using the authorization and verification device 150, may register the new internal device (e.g., transmit information corresponding to the new internal device) with the internal footprint computing platform 110. Further, the internal device verification server 120 may transmit information corresponding to known internal devices to the internal device verification server 120.

At step 202, internal footprint computing platform 110 may store information corresponding to the internal devices in the internal device verification server 120. For example, after receiving the internal device information in step 201, internal footprint computing platform 110 may transmit, via the communication interface 116, the information corresponding to the internal devices to the internal device verification server 120. The internal device verification server 120 may store the information in memory. In some examples, the internal footprint computing platform 110 may store the information in the internal footprint computing platform memory 112.

At step 203, internal footprint computing platform 110 may receive external account information. For example, at step 203, internal footprint computing platform 110 may receive external account information from the external account authorization server 130 and/or the authorization and verification device 150. External account information may include information corresponding to a plurality of accounts (e.g., banking accounts) managed by the organization. For example, one or more accounts managed by or associated with the organization may include a client's account and/or an associate's account. In some examples and explained in further detail below, external account information may include information used to determine unauthorized use of an account managed by the organization. In some examples, external account information may include information corresponding to clickstream or event actions corresponding to one or more external accounts. The authorization and verification device 150 may transmit the external account information to the internal footprint computing platform 110. For example, when a client or associate opens a new account with the organization, the authorization and verification device 150 may transmit information corresponding to the new account to the internal footprint computing platform 110. Further, the external account authorization server 130 may transmit, to the internal footprint computing platform 110, external account information corresponding to known accounts managed by the organization.

At step 204, internal footprint computing platform 110 may store the external account information in the external account authorization server 130. For example, after receiving the external account information in step 203, internal footprint computing platform 110 may transmit, via the communication interface 116, the external account information to the external account authorization server 130. The external account authorization server 130 may store the information in memory. In some examples, the internal footprint computing platform 110 may store the information in the internal footprint computing platform memory 112.

Figure 2B:
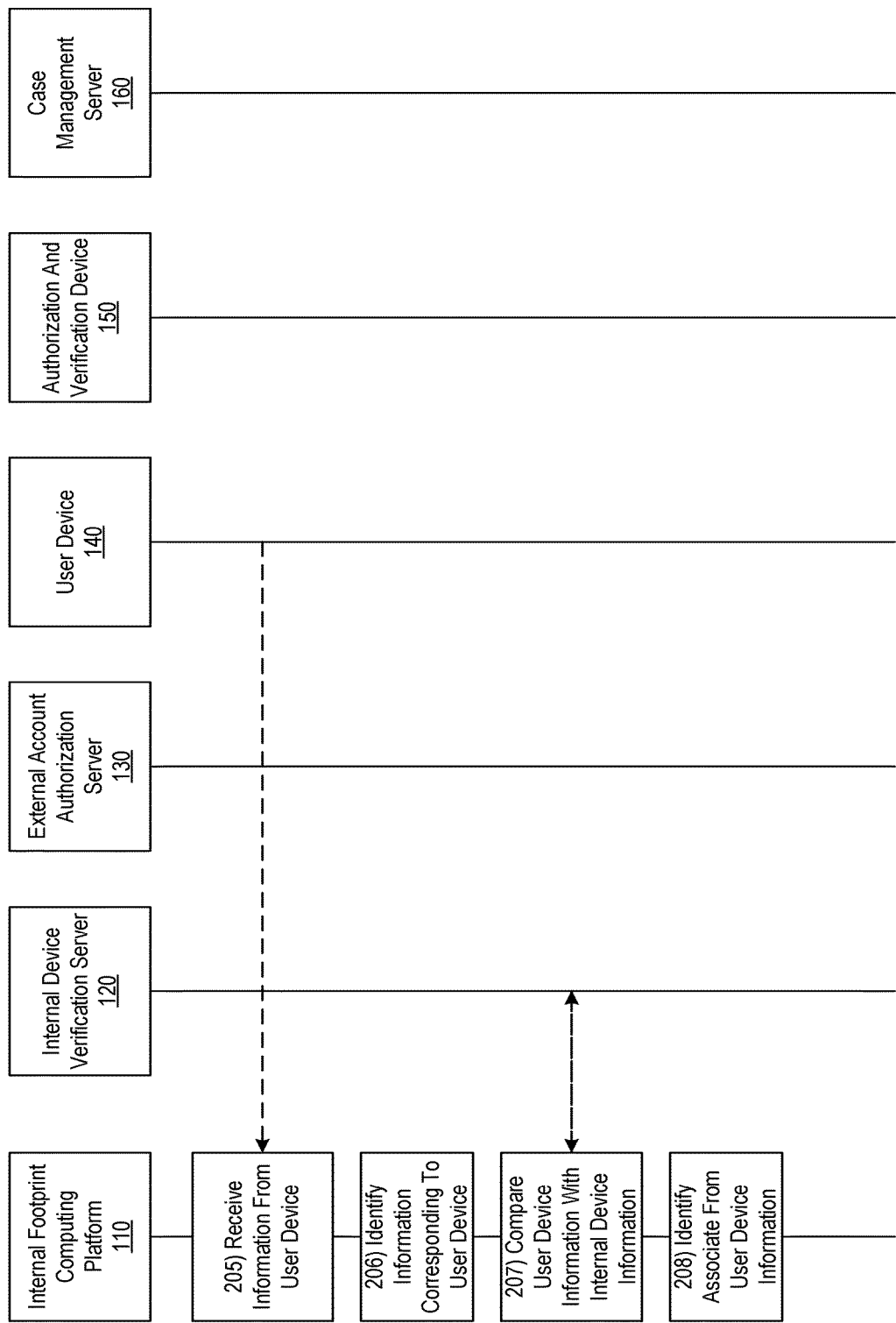

Referring to FIG. 2B, at step 205, internal footprint computing platform 110 may receive information from a user device. For example, at step 205, internal footprint computing platform 110 may receive information from user device 140 (e.g., a device provided to an associate by the organization, an associate's personal device, or a client's user device). The information received from the user device 140 may comprise user device identification information, accessed account information and/or other information associated with the user device 140. User device identification information may include any information used to identify a user device 140. The internal footprint computing platform 110 may use the user device identification information, as explained below, to identify whether the user device 140 is an internal device. Accessed account information, as explained in further detail below, may include any information associated with an account accessed by the user device 140. For example, a user, using user device 140, may access an account, such as a banking account, associated with an organization. The internal footprint computing platform 110 may use the accessed account information to identify the account accessed by the first user device 140.

At step 206, internal footprint computing platform 110 may identify, based on the user device identification information, user device information. Internal footprint computing platform 110 may use the user device information to determine if the user device 140 is an internal device. The user device information may include mobile cookie information, geolocation information, information associated with a time of the request, virtual private network information, and/or internet protocol information.

At step 207, internal footprint computing platform 110 may compare user device information with internal device information. For example, at step 207, internal footprint computing platform 110 may compare user device information (e.g., identified in step 206) and internal device information (e.g., received in step 201). In some embodiments, the internal footprint computing platform 110 may generate and transmit one or more commands to direct a server (e.g., internal device verification server 120) to compare the user device information with the internal device information.

In some examples, user device information may include mobile cookie information corresponding to the user device 140. Mobile cookies may include small files of data transmitted from servers to a user device (e.g., user device 140). For example, when user device 140 accesses a website, a mobile cookie may be transmitted from the server corresponding to the website to the user device 140. The user device 140 may store the mobile cookie, and the mobile cookie may comprise information associated with the user device 140 and/or the accessed website. In some embodiments, the internal footprint computing platform 110 may compare the mobile cookie information with the internal device information. For example, the mobile cookie information may include information to assist in identifying the user device 140 and/or the user accessing the website as an internal device and/or associate of an organization. The internal footprint computing platform 110 may compare the identifying information with the internal device information to determine the likelihood that the user device 140 is an internal device.

In some instances, mobile cookie information may include authentication cookies to store login information. For example, some websites may seek login information, such as passwords, usernames, and/or other information associated with the user and/or the user device 140, to access the website. Authentication cookies may include data files that store login information associated with the user and/or the user device 140 to access the website. After the initial login of the user, the login information may be saved onto the user device 140 as an authentication cookie. When the user and/or the user device 140 attempts to re-access the website, the authentication cookie, including the login information may be retrieved and used to re-access the website.

In some embodiments, internal footprint computing platform 110 may compare login information with the internal device information to determine if the user device 140 is an internal device. For example, the internal footprint computing platform 110, using the login information, may identify the user and/or the user device 140 accessing the website. The internal device information may include information corresponding to multiple known internal devices and/or users (e.g., associates of the organization) associated with the internal devices. The internal footprint computing platform 110 may compare the authentication cookies (e.g., the identified users and/or the identified user device 140) with the internal device information (e.g., the multiple known internal devices and/or associates). Based on the comparison, the internal footprint computing platform 110 may determine the likelihood the user device 140 is an internal device.

In some instances, user device information may include geolocation information corresponding to the user device 140. Geolocation information may indicate a real-world geographic location of the user device 140. For example, geolocation information may indicate a physical address corresponding to the location of the user device 140 when the internal footprint computing platform 110 received the user device identification information in step 205. In some instances, the geolocation information may indicate geographic coordinates (e.g., latitude and longitude information) corresponding to the location of the user device 140. The internal device information may include information indicating geolocations associated with the organization. For example, the organization may include physical establishments, such as store fronts and/or office buildings, to perform organization-related functions. The physical establishments may be associated with a geolocation, such as a physical address and/or a geographic location.

The internal footprint computing platform 110 may compare the geolocation of the user device 140 with the geolocation of the organization's physical establishments. In some examples, the geolocation of the user device 140 may be identical to the geolocation of the organization's physical establishments (e.g., the user device 140 may be used within the physical establishment of the organization). In some examples, the geolocation of the user device 140 may be within a certain distance from the organization's geolocation. The internal footprint computing platform 110 may determine the distance between the user device's geolocation and the organization's geolocation. In some examples, associates of the organization may provide an addresses (e.g., a geolocation) associated with the associates. The internal footprint computing platform 110 may compare geolocation information corresponding to the user device 140 with the geolocation corresponding to the addresses. The internal footprint computing platform 110 may determine the likelihood that the user device 140 is an internal device based on the comparison between the geolocation indicating the location of the user device 140 with the geolocation corresponding to the organization's physical establishments and/or the addresses provided by the associates.

In some embodiments, user device information may correspond to a time the internal footprint computing platform 110 received the user device identification information. Further, the user device information may include a time zone corresponding a location of the user device 140. Internal device information may include information corresponding to times and/or time zones associated with the organization. In some examples, the organization may perform organization-related functions at certain times (e.g., 8 AM to 6 PM). Internal footprint computing platform 110 may compare the time the internal footprint computing platform 110 received the user device identification information in step 205 with the certain times the organization performs organization-related functions. Based on the comparison, the internal footprint computing platform 110 may determine the likelihood the user device 140 is an internal device.

In some instances, the organization may perform organization-related functions in certain geographic regions, including different time zones. Internal device information may include information corresponding to the time zones the organization performs organization-related functions. For example, an organization may regularly perform organization-related functions in US time zones (e.g., pacific time, mountain time, central time, eastern time). Based on a comparison between the time zone corresponding to the user device 140 and the information corresponding to the time zones the organization regularly performs organization-related functions, the internal footprint computing platform 110 may determine the likelihood the user device 140 is an internal device.

In some examples, user device information may include device print information corresponding to the user device 140. The internal device information may indicate device prints for multiple internal devices and/or the associates associated with the multiple internal devices. Internal footprint computing platform 110 may compare the device print information and the internal device information. Based on the comparison, the internal footprint computing platform 110 may determine the likelihood the user device 140 is an internal device.

In some instances, user device information may include virtual private network (VPN) information. For example, the user device 140 may access network 170 through a VPN. Internal footprint computing platform 110 may receive user device information indicating the VPN used by the user device 140. An organization may host and/or provide one or more VPN's. Internal device information may include information indicating VPN's associated with the organization. Based on a comparison between the organization's VPN and the VPN used by the user device 140, the internal footprint computing platform may determine the likelihood the user device 140 is an internal device.

In some embodiments, user device information may include internet protocol (IP) address information associated with the user device 140. For example, a user device 140 may access the network 170 using an IP address. Internal device information may include information indicating IP addresses of internal devices. Based on a comparison between the IP addresses of internal devices and the user device's 140 IP address, the internal footprint computing platform 110 may determine the likelihood the user device 140 is an internal device.

At step 208, internal footprint computing platform 110 may identify an associate from the user device information. For example, at step 208, internal footprint computing platform 110 may identify an associate of the organization based on the comparison of the user device information with the internal device information in step 207. The internal footprint computing platform 110 may use the mobile cookie information, the geolocation information, the time zone information, the device print information, the VPN information, and/or the IP address information to identify the associate of the organization. In some embodiments, the internal footprint computing platform 110 may generate and transmit one or more commands to direct a server (e.g., internal device verification server 120) to perform step 208.

In some instances, mobile cookie information may be used to identify the associate. For example, mobile cookie information may include login information indicating a user is accessing the website. Based on the comparison between the login information (e.g., the user accessing the website) and the internal device information (e.g., associates of the organization), internal footprint computing platform 110 may identify the user as an associate of the organization.

In some examples, geolocation information may be used to identify the associate. For example, based on the comparison between the geolocation information indicating the location of the user device 140 with the geolocation information indicating addresses corresponding to associates of the organization, the internal footprint computing platform 110 may identify the associate.

In some embodiments, device print information may be used to identify the associate. For example, based on the comparison between the device print information (e.g., device print of the user device 140) with the internal device information (e.g., known internal devices and associates owning the internal devices), the internal footprint computing platform 110 may identify the associate of the organization.

In some instances, IP address information may be used to identify the associate. For example, each internal device may be assigned a unique IP address. Further, each internal device may be assigned to a different associate within the organization. Based on the comparison between the IP address of the user device 140 and the IP addresses of the internal devices, the internal footprint computing platform may identify the associate of the organization.

Figure 2C:
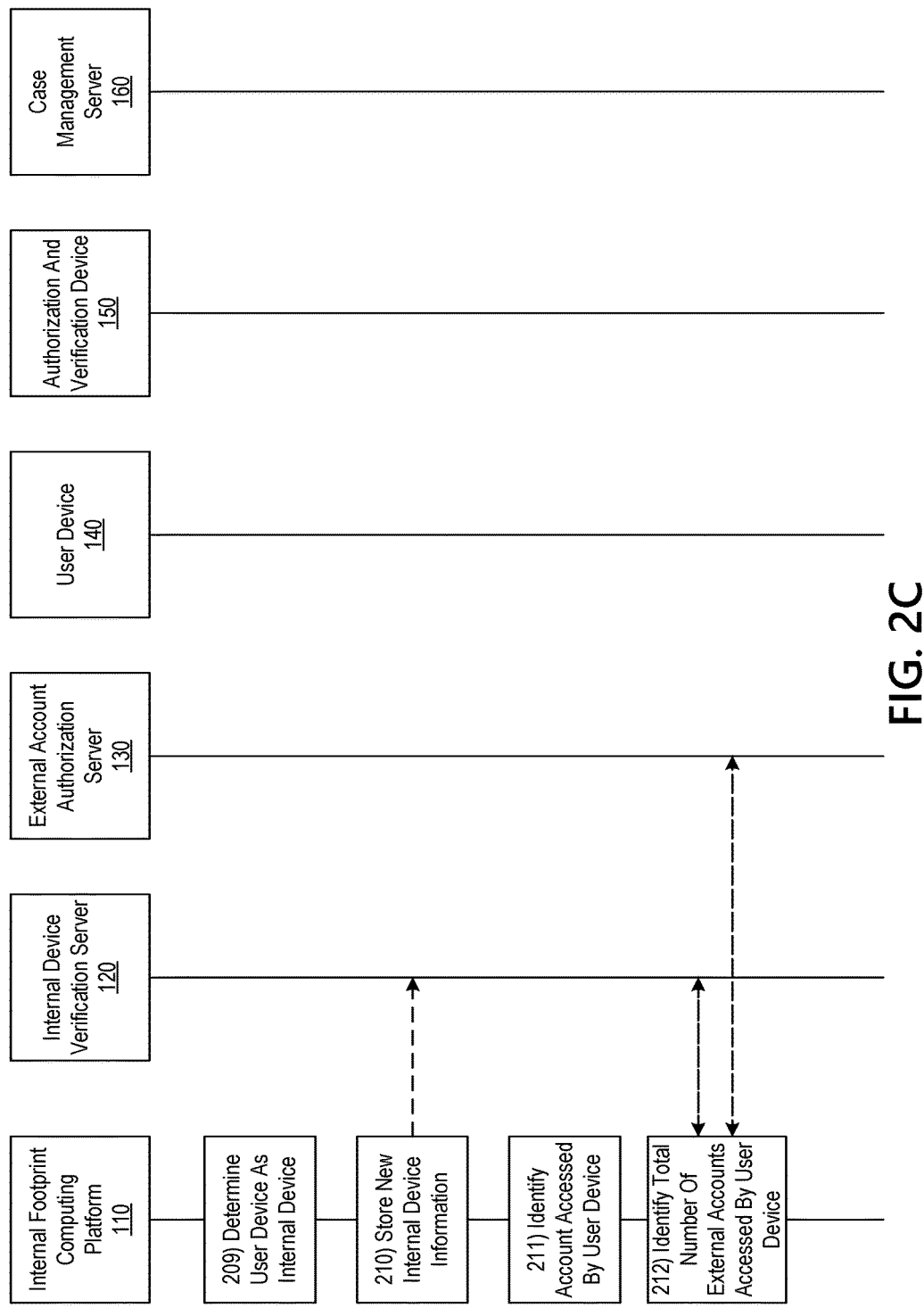

Referring to FIG. 2C, at step 209, internal footprint computing platform 110 may determine the user device 140 is an internal device. For example, based on the comparison between the user device information with the internal device information in step 207 and/or based on identifying the associate in step 208, the internal footprint computing platform 110 may determine the user device 140 is an internal device. In some instances, in determining whether user device 140 is an internal device, the internal footprint computing platform 110 may assign different weights to and/or calculate a score based on the mobile cookie information, the geolocation information, the time zone information, the device print information, the VPN information, the IP address information, and/or the identity of the associate to determine whether the user device 140. If, for example, the score meets or exceeds a predetermined threshold, internal footprint computing platform 110 may determine that user device 140 is an internal device. Alternatively, if the score does not meet or exceed the predetermined threshold, internal footprint computing platform 110 may determine that user device 140 is not an internal device. In some embodiments, the internal footprint computing platform 110 may generate and transmit one or more commands to direct a server (e.g., internal device verification server 120) to perform step 209.

In some examples, one factor (e.g., the mobile cookie information, the geolocation information, the time zone information, the device print information, the VPN information, the IP address information, and/or the identity of the associate to determine whether the user device 140) may receive a score that meets or exceeds the predetermined threshold. For example, based on the comparison between the device print of the user device 140 matching a known internal device print, the internal footprint computing platform 110 may assign a score for the device print information that meets the predetermined threshold. In some instances, two or more factors (e.g., the mobile cookie information, the geolocation information, the time zone information, the device print information, the VPN information, the IP address information, and/or the identity of the associate to determine whether the user device 140) may be combined to meet or exceed the predetermined threshold. For example, the internal footprint computing platform 110 may assign the time zone information a score below the predetermined threshold, and may further assign the geolocation information a score below the predetermined threshold. If the cumulative scores between the factors (e.g., the time zone information and the geolocation information) meet or exceed the predetermined threshold, the internal footprint computing platform 110 may determine the user device 140 is an internal device.

At step 210, internal footprint computing platform 110 may store the new internal device information. For example, after determining the user device 140 is an internal device in step 209, the internal footprint computing platform 110 may transmit, via the communication interface 116, information indicating the user device 140 is an internal device to the internal device verification server 120. The internal device verification server 120 may store the information in memory. In some examples, the internal footprint computing platform 110 may store the information in the internal footprint computing platform memory 112. In some instances, the internal footprint computing platform 110 may store the device print information of the user device 140 as the new internal device information.

In another iteration of the process, the internal footprint computing platform 110 may identify a user device 140 as an internal device based on the new internal device information. For example, in another iteration of the process, the internal footprint computing platform 110 may receive information from the same user device 140 (e.g., the user device 140 is accessing an account). The internal footprint computing platform 110 may retrieve the new internal device information from the internal device verification server 120. The internal footprint computing platform 110 may determine the same user device 140 is an internal device based on the new internal device information.

At step 211, internal footprint computing platform 110 may identify, based on the accessed account information, an account accessed by the user device 140. The account (e.g., a bank account) accessed by the user device 140 may be an account managed by an organization. The account may be associated with an associate of the organization and/or a client of the organization. For example, clients or associates may maintain multiple accounts with an organization, such as a checking account, a savings account, an interest-bearing checking account, a money market deposit account, and/or a certificate of deposit account. The user device 140 may access one or more accounts managed by the organization. The internal footprint computing platform 110 may identify, based on the accessed account information, the account accessed by the user device 140, the type of account accessed by the user device 140, the clients and/or associates associated with the account (e.g., the owners, fiduciaries, and/or employees of the organization that manage the account), and/or physical addresses associated with the account (e.g., the addresses for the clients and/or associates associated with the account).

In some instances, the account accessed by the user device 140 may be an external account. An external account may be an account accessed by a user that is not the user's personal account. In some examples, an associate of the organization may access an account (e.g., an external account) owned by a client to perform organization-related functions. For example, a client may decide to open an account with the organization. An associate may assist the client in opening the external account and setting up the external account. In some examples, an associate of the organization may access the account for reasons other than to perform organization-related functions. For example, an associate may also be a client of the organization and may maintain multiple accounts managed by the organization. The associate may access the multiple personal accounts (e.g., internal accounts) managed by the organization. In other examples, the associate may not be authorized to use or access the account (e.g., accessing another person's account without authorization). The organization may desire to identify instances of unauthorized use or access of the external account by associates of the organization.

At step 212, internal footprint computing platform 110 may identify, based on the identified accessed account described above and/or based on the determination of whether the user device 140 is an internal device described above, a total number of external accounts accessed by the user device 140. For example, when an associate, using the user device 140, accesses a total number of external accounts above a threshold set by the internal footprint computing platform 110, the internal footprint computing platform 110 may identify a likelihood the user device 140 might not have authority to access the account. In some embodiments, the internal footprint computing platform 110 may generate and transmit one or more commands to direct a server (e.g., external account authorization server 130) to perform step 212.

In some instances, the internal footprint computing platform 110 may identify the account accessed in step 211 is an external account. The internal footprint computing platform 110 may include the user device 140 accessing the external account in step 211 in the total number of external accounts accessed by the user device 140. In some examples, the internal footprint computing platform 110 may determine, based on identifying the user device 140 is an internal device, the total number of external accounts accessed by the user device 140. For example, after determining the user device 140 is an internal device in step 209, the internal footprint computing platform 110 may identify other instances the user device 140 or the identified internal device accessed an external account. The internal footprint computing platform 110 may retrieve other instances the user device 140 accessed an external account from the internal device verification server 120.

In some instances, the internal footprint computing platform 110 may identify a total amount of external accounts accessed by an associate of the organization. For example, after identifying the associate of the organization in step 208, the internal footprint computing platform 110 may identify other instances the associate accessed an external account. Based on the other instances the associate accessed an external account, the internal footprint computing platform 110 may determine a total number of times associate accessed an external account.

In some instances, the internal footprint computing platform 110 may determine a velocity of the external accounts accessed by the associate and/or the user device 140. For example, the internal footprint computing platform 110 may determine the velocity (e.g., the total number of external accounts accessed by an associate and/or by the user device 140 over a period of time). An associate, performing organization-related functions, may access a few external accounts per day. The internal footprint computing platform 110 may determine unauthorized use or access of the external accounts if the associate is accessing a number of external accounts per day over a set threshold.

Figure 2D:
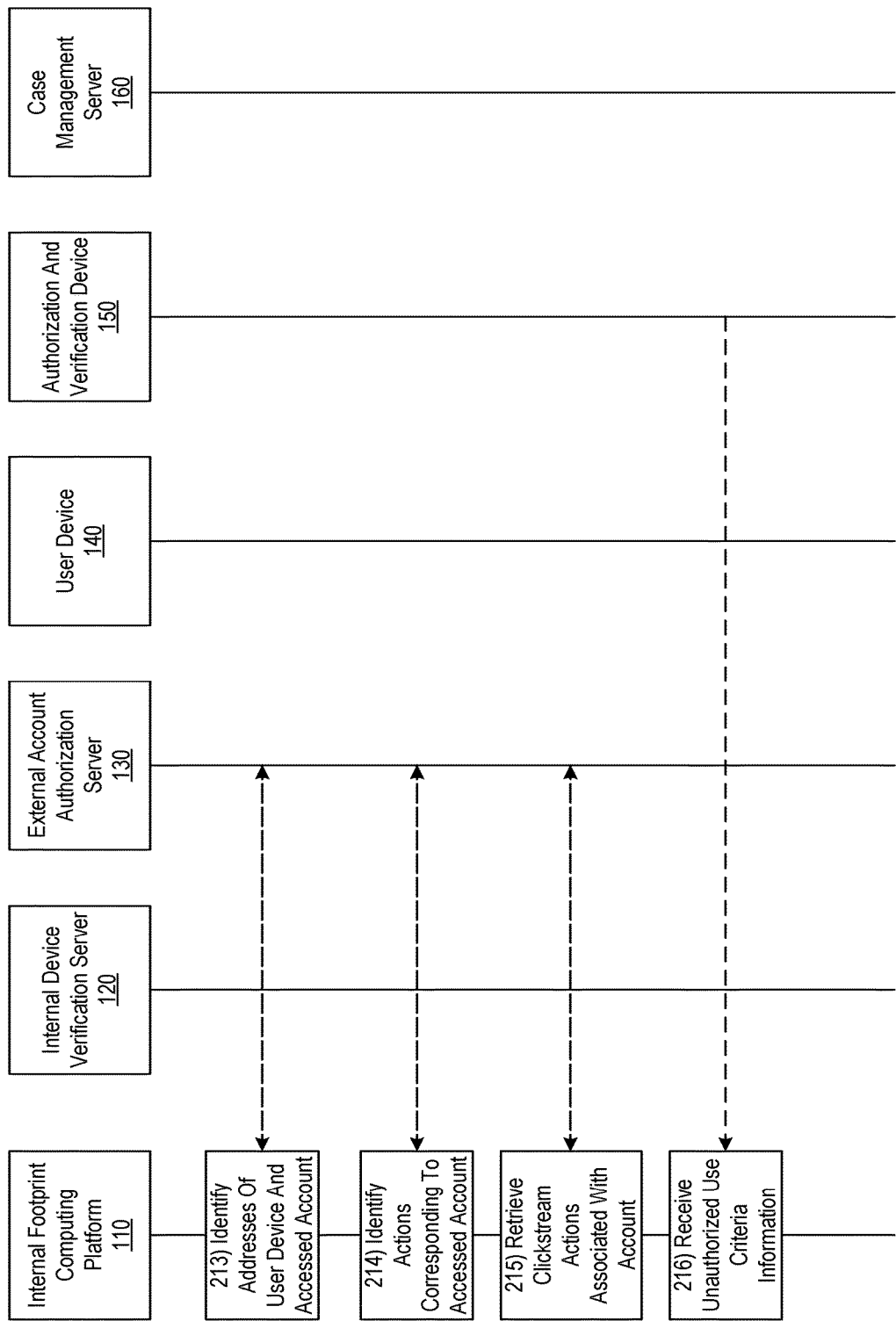

Referring to FIG. 2D, at step 213, internal footprint computing platform 110 may identify addresses of the user device 140 and the accessed account. For example, at step 213, internal footprint computing platform 110 may identify an address of the user device 140 (e.g., the geolocation of the user device 140) and an address associated with the accessed account. In some examples, the geolocation of the user device 140 may be used to determine a physical address of the user device 140 as the user device 140 is transmitting information to the internal footprint computing platform 110. In some instances, the address associated with the accessed account may be the address of an associate and/or a client associated with the account. The internal footprint computing platform 110 may compare the physical address of the user device 140 with the address associated with the account (e.g., the address of an owner of the account) to determine the likelihood of unauthorized use or access of the account. In some embodiments, the internal footprint computing platform 110 may generate and transmit one or more commands to direct a server (e.g., external account authorization server 130) to perform step 213.

At step 214, internal footprint computing platform 110 may identify actions corresponding to the accessed account. For example, the internal footprint computing platform 110 may identify event actions associated with accessing the external account by the user device 140. Event actions associated with accessing the external account may include login incentive credit, extracting funds, changing account information (e.g., changing addresses), and/or otherwise accessing the account. Certain event actions, such as extracting funds from the account, may indicate a higher risk of unauthorized use or access of the account than other event actions. The internal footprint computing platform 110 may set different weights to the event actions to determine the likelihood of unauthorized use or access of the account. In some embodiments, the internal footprint computing platform 110 may generate and transmit one or more commands to direct a server (e.g., external account authorization server 130) to perform step 214.

At step 215, internal footprint computing platform 110 may retrieve, via the communication interface 116 and from the external account authorization server, clickstream information associated with the account. For example, internal footprint computing platform 110 may retrieve clickstream information, such as the account opening date, the enrollment date, the account balances over the lifetime of the account, and/or event actions taken during login sessions for the account upon creation of the account, associated with the account. The internal footprint computing platform 110 may determine the likelihood of unauthorized use or access of the account based on the clickstream information. For example, fake accounts may be created for login incentive credit. The internal footprint computing platform 110 may determine real client accounts from fake accounts created for login incentive credit based on the clickstream information (e.g., the event actions taken during past login sessions for the account). In some embodiments, the internal footprint computing platform 110 may generate and transmit one or more commands to direct a server (e.g., external account authorization server 130) to perform step 215.

At step 216, internal footprint computing platform 110 may receive unauthorized use criteria information. For example, the internal footprint computing platform 110 may receive, via the communication interface 116 and from the authorization and verification device 150, information indicating unauthorized use criteria. An administrator of the organization, using the authorization and verification device 150, may transmit information indicating unauthorized use criteria. The internal footprint computing platform 110 may determine, based on the information indicating unauthorized use criteria, unauthorized use or access of an account.

Figure 4:
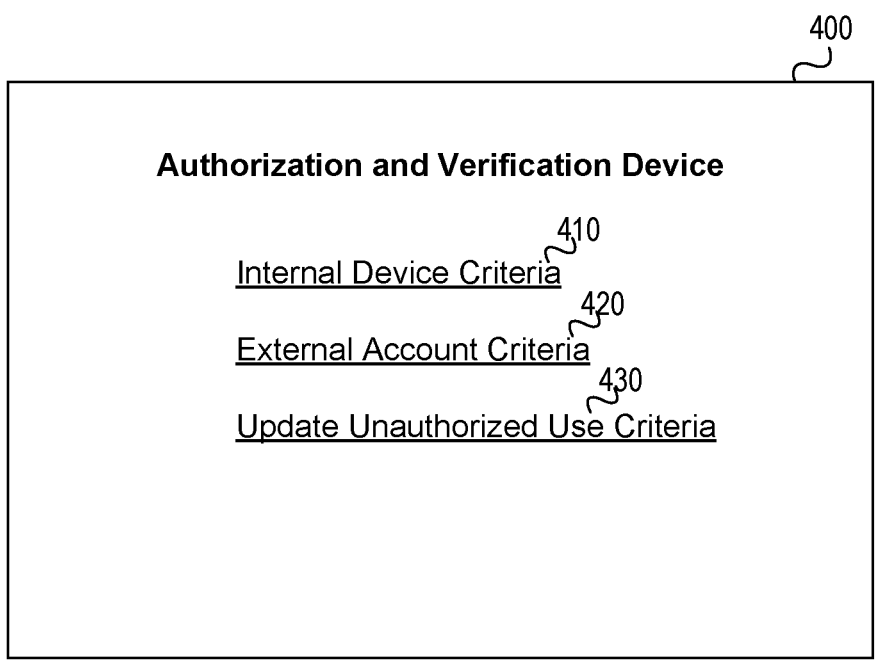

As seen in FIG. 4, graphical user interface 400 may include one or more fields, controls, and/or other elements that may allow a user (e.g., an administrator of the organization) of a user device (e.g., authorization and verification device 150) to interact with links to change the unauthorized use criteria. For example, the graphical user interface 400 may allow a user to use links to set internal device criteria 410, set external account criteria 420, and/or update unauthorized use criteria 430. After the user (e.g., the administrator) sets the unauthorized use criteria, the user device (e.g., the authorization and verification device 150) may transmit information indicating the unauthorized use criteria to the internal footprint computing platform 110.

In some examples, the administrator may use the authorization and verification device 150 to set the internal device criteria for determining whether the user device 140 is an internal device as described above. In some embodiments, the administrator may use the authorization and verification device 150 to set the external account criteria 420 for determining unauthorized use or access of the external account as described above. In some instances, the administrator may use the authorization and verification device 150 to update unauthorized use criteria 430 as explained below.

Referring to FIG. 2E, at step 217, internal footprint computing platform 110 may determine unauthorized use of the account. For example, the internal footprint computing platform 110 may determine the unauthorized use of the account based on the received unauthorized use criteria information in step 216. Based on the determination, the internal footprint computing platform 110 may generate a report of the unauthorized use of the account. In some embodiments, the internal footprint computing platform 110 may generate and transmit one or more commands to direct a server (e.g., internal device verification server 120 and/or external account authorization server 130) to perform step 217.

For example, the information indicating unauthorized use criteria may assist the internal footprint computing platform 110 determine the user device 140 is an internal device as explained above. The administrator may instruct a device (e.g., the authorization and verification device 150) associated with the internal footprint computing platform 110 to set different weights for the mobile cookie information, the geolocation information, the time zone information, the device print information, the VPN information, the IP address information, and/or the identity of the associate to determine whether the user device 140 is an internal device.

In some examples, the information indicating unauthorized use criteria may assist the internal footprint computing platform 110 determine the likelihood of unauthorized use or access of the account as explained above. For example, the information indicating unauthorized use criteria may set a threshold for the number of external accounts accessed by the user device 140.

Figure 3:
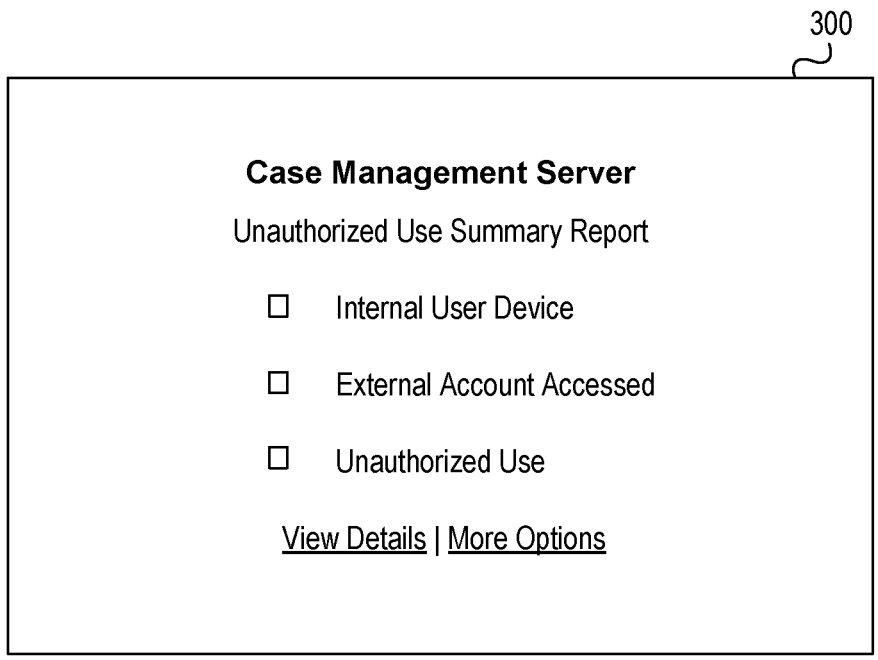
FIGS. 3 and 4 depict example graphical user interfaces for preventing unauthorized access to an external user account using an internal footprint repository.

At step 218, internal footprint computing platform 110 may transmit, via the communication interface 116 and to the case management server 160, unauthorized use information. For example, the unauthorized use information may include a report that indicates unauthorized use of the account by the user device 140. As seen in FIG. 3, graphical user interface 300 may include one or more fields, controls, and/or other elements that may allow a user (e.g., an administrator of the organization) to view an unauthorized use summary report in the case management server. For example, the graphical user interface 300 may allow a user (e.g., an administrator) to view whether the user device 140 is an internal user device, whether the external account accessed is an external account, and/or whether there was unauthorized use of the external account accessed by the user device 140. Further, graphical user interface 300 may allow a user to interact with links to view details and/or access more options. For example, a user may view more details associated with whether the user device 140 is an internal user device, whether the external account accessed is an external account, and/or whether there was unauthorized use of the external account accessed by the user device 140. Additionally, the user may access more options, such as set internal device criteria 410, set external account criteria 420, and/or update unauthorized use criteria 430.

At step 219, internal footprint computing platform 110 may receive, via the communication interface 116 and to the case management server 160, updated unauthorized use information. For example, after the internal footprint computing platform 110 transmits the unauthorized use information in step 218, administrators of the organization may review the report indicating unauthorized use of the account by the user device 140. Based on the review and referring back to FIG. 4, the administrators may update unauthorized use criteria by using the update unauthorized use criteria link 430. For example, the internal footprint computing platform 110 may determine the user device 140 was unauthorized to access the external account. The administrators may determine if this was a false-positive (e.g., the user device 140 was authorized to access the external account). The administrators may determine factors related to the reason the internal footprint computing platform 110 determined the user device 140 was unauthorized to access the external account. The administrators may use the update unauthorized use criteria link 430 to update the unauthorized use criteria. In another iteration of the process, the internal footprint computing platform 110 may account for the update to the unauthorized use criteria to determine if the user device 140 is unauthorized to access the external account.

At step 220, internal footprint computing platform 110 may update the unauthorized use criteria information. For example, the internal footprint computing platform 110 may transmit, via the communication interface 116, the updated unauthorized use information received in step 219 to the internal device verification server 120, the external account authorization server 130, the authorization and verification device 150 and/or the case management server 160.

Figure 5:
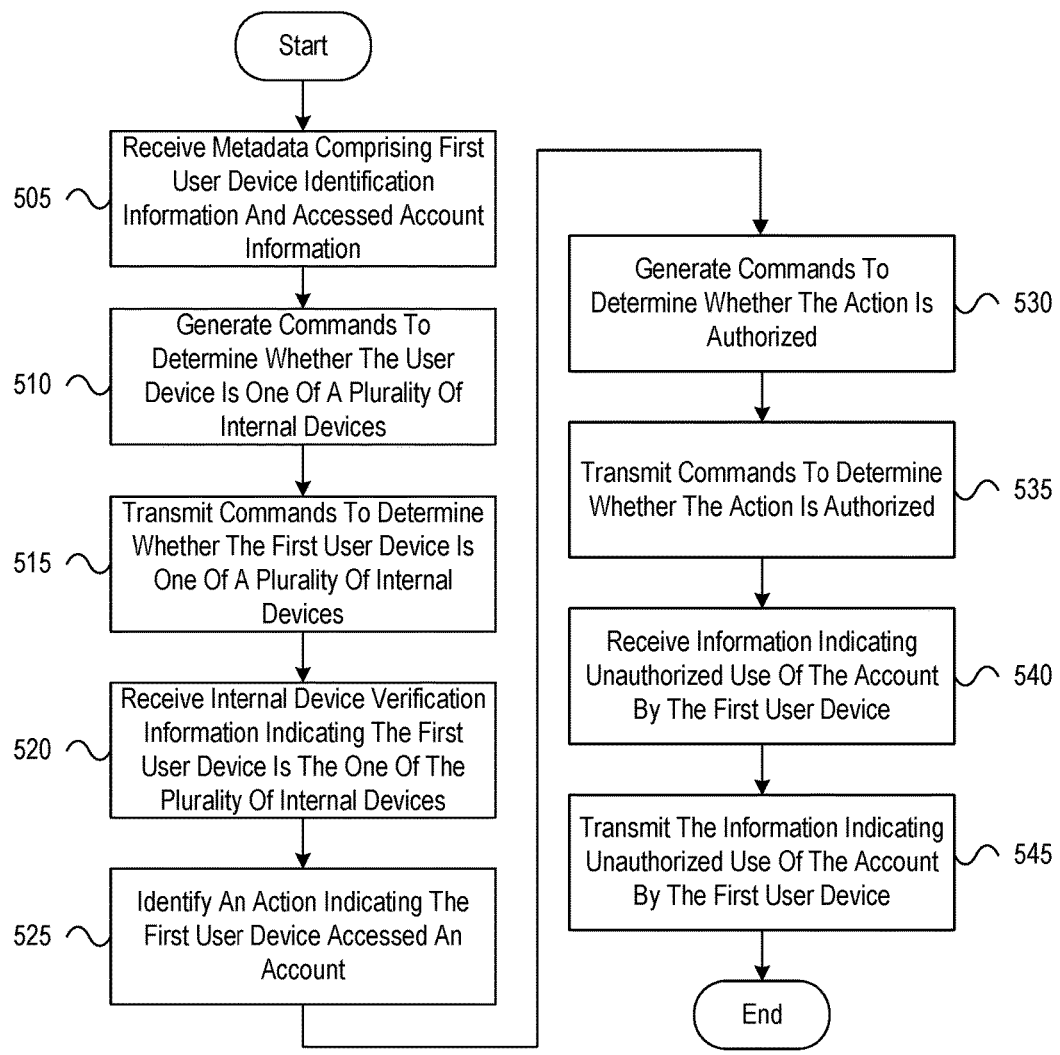
FIG. 5 depicts an illustrative method for preventing unauthorized access to an external user account using an internal footprint repository in accordance with one or more example embodiments.

FIG. 5 depicts an illustrative method for preventing unauthorized access to an external user account using an internal footprint repository in accordance with one or more example embodiments. Referring to FIG. 5, at step 505, a computing platform having at least one processor, a memory, and a communication interface may receive, via the communication interface, from a first user device, metadata comprising first user device identification information and accessed account information. At step 510, the computing platform may generate, based on the first user device identification information, one or more commands directing an internal device verification server to determine whether the first user device is one of a plurality of internal devices. At step 515, the computing platform may transmit, via the communication interface and to the internal device verification server, the one or more commands to determine whether the first user device is the one of the plurality of internal devices. At step 520, the computing platform may receive, via the communication interface and from the internal device verification server, internal device verification information indicating the first user device is the one of the plurality of internal devices. At step 525, the computing platform may, in response to receiving the internal device verification information, identify, based on the accessed account information, an action indicating the first user device accessed an account. At step 530, the computing platform may generate, based on the action and the accessed account information, one or more commands directing an external account authorization server to determine whether the action is authorized. At step 535, the computing platform may transmit, via the communication interface and to the external account authorization server, the one or more commands directing the external account authorization server to determine whether the action is authorized. At step 540, the computing platform may receive, via the communication interface and from the external account authorization server, information indicating unauthorized use of the account by the first user device. At step 545, the computing platform may transmit, via the communication interface and to a case management server, the information indicating unauthorized use of the account by the first user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, by the at least one processor, via the communication interface, and from a first user device, metadata comprising first user device identification information and accessed account information;
   generate, based on the first user device identification information, one or more commands directing an internal device verification server to determine whether the first user device is one of a plurality of internal devices;
   transmit, via the communication interface and to the internal device verification server, the one or more commands to determine whether the first user device is the one of the plurality of internal devices;
   receive, via the communication interface and from the internal device verification server, internal device verification information indicating the first user device is the one of the plurality of internal devices;
   in response to receiving the internal device verification information, identify, based on the accessed account information, an action indicating the first user device accessed an account;
   generate, based on the action and the accessed account information, one or more commands directing an external account authorization server to determine whether the action is authorized;
   transmit, via the communication interface and to the external account authorization server, the one or more commands directing the external account authorization server to determine whether the action is authorized;
   receive, via the communication interface and from the external account authorization server, information indicating unauthorized use of the account by the first user device;
   transmit, via the communication interface and to a case management server, the information indicating unauthorized use of the account by the first user device;

receive, via the communication interface and from the case management server, updated unauthorized use information; and update unauthorized use criteria information based on the updated unauthorized use information received from the case management server.

2. The computing platform of claim 1, wherein the memory stores additional computer-readable instructions that, when executed by the at least one processor, cause the computing platform to:

receive, by the at least one processor, via the communication interface, and from an authorization device, information corresponding to the plurality of internal devices; and transmit, via the communication interface and to the internal device verification server, the information corresponding to the plurality of internal devices and the first user device identification information.

3. The computing platform of claim 2, wherein generating the one or more commands directing the internal device verification server to determine whether the first user device is the one of the plurality of internal devices comprises:

determining, based on a comparison of the first user device identification information with the information corresponding to the plurality of internal devices, the internal device verification information indicating the first user device is the one of the plurality of internal devices; and transmitting the internal device verification information.

4. The computing platform of claim 3, wherein the first user device identification information comprises mobile cookie information indicating at least one mobile cookie corresponding to the first user device.

5. The computing platform of claim 3, wherein the first user device identification information comprises geolocation information indicating a geolocation corresponding to the first user device.

6. The computing platform of claim 3, wherein the first user device identification information comprises time zone information indicating a time zone corresponding to the first user device.

7. The computing platform of claim 3, wherein the first user device identification information comprises device print information indicating a device print corresponding to the first user device.

8. The computing platform of claim 3, wherein the first user device identification information comprises virtual private network information indicating a virtual private network corresponding to the first user device.

9. The computing platform of claim 3, wherein the first user device identification information comprises internet protocol information indicating an internet protocol corresponding to the first user device.

10. The computing platform of claim 3, wherein the determining, based on the comparison of the first user device identification information with the information corresponding to the plurality of internal devices, the internal device verification information indicating the first user device is the one of the plurality of internal devices comprises:

identifying, based on a comparison of the first user device identification information with the information corresponding to the plurality of internal devices, the first user device as a new internal device; and storing information indicating the first user device as a new internal device.

11. The computing platform of claim 3, wherein the first user device identification information comprises first user identification information; and wherein the information corresponding to the plurality of internal devices comprises information corresponding to associates of an organization.

12. The computing platform of claim 1, wherein the memory stores additional computer-readable instructions that, when executed by the at least one processor, cause the computing platform to:

receive, by the at least one processor, via the communication interface, and from an authorization device, information corresponding to a plurality of external accounts; and transmit, via the communication interface and to the external account authorization server, the information corresponding to the plurality of external accounts and the accessed account information.

13. The computing platform of claim 12, wherein generating the one or more commands directing the external account authorization server to determine whether the action is authorized comprises:

determining, based on the account the first user device is accessing and the information corresponding to the plurality of external accounts, the information indicating unauthorized use of the account by the first user device; and transmitting the information indicating unauthorized use of the account by the first user device.

14. The computing platform of claim 13, wherein generating the one or more commands directing the external account authorization server to determine whether the action is authorized comprises:

determining, based on the account the first user device is accessing and the information corresponding to the plurality of external accounts, an amount of accounts accessed by the first user device over a period of time; and wherein the determining the information indicating unauthorized use of the account by the first user device is based on the amount of accounts accessed by the first user device over the period of time.

15. The computing platform of claim 13, wherein generating the one or more commands directing the external account authorization server to determine whether the action is authorized comprises:

determining, based on the account the first user device is accessing and the information corresponding to the plurality of external accounts, an address corresponding to the first user device and an address corresponding to the account accessed by the first user device; and wherein the determining the information indicating unauthorized use of the account by the first user device is based on the address corresponding to the first user device and the address corresponding to the account accessed by the first user device.

16. The computing platform of claim 13, wherein the determining the information indicating unauthorized use of the account by the first user device is based on the action indicating the first user device is accessing the account.

17. The computing platform of claim 13, wherein the information corresponding to the plurality of external accounts comprises information corresponding to a plurality of event actions corresponding to the account accessed by the first user device; and wherein the determining the information indicating unauthorized use of account by the first user device is based on the plurality of event actions.

18. The computing platform of claim 1, wherein the memory stores additional computer-readable instructions that, when executed by the at least one processor, cause the computing platform to:
receive, by the at least one processor, via the communication interface, and from a second user device, second metadata comprising second user device identification information and second accessed account information;
generate, based on the second user device identification information, one or more commands directing the internal device verification server to determine whether the second user device is the one of the plurality of internal devices;
transmit, via the communication interface and to the internal device verification server, the one or more commands to determine whether the second user device is the one of the plurality of internal devices;
receive, via the communication interface and from the internal device verification server, second internal device verification information indicating the second user device is the one of the plurality of internal devices;
in response to receiving the second internal device verification information, identify, based on the second accessed account information, a second action indicating the second user device accessed a second account;
generate, based on the second action and the second accessed account information, one or more commands directing the external account authorization server to determine whether the second action is authorized;
transmit, via the communication interface and to the external account authorization server, the one or more commands directing the external account authorization server to determine whether the second action is authorized;
receive, via the communication interface and from the external account authorization server, information indicating unauthorized use of the second account by the second user device; and
transmit, via the communication interface and to the case management server, the information indicating unauthorized access of the second account by the second user device.

19. A method, comprising:
at a computing platform comprising at least one processor, memory, and a communication interface:
receiving, by the at least one processor, via the communication interface, and from a first user device, metadata comprising first user device identification information and accessed account information;
generating, based on the first user device identification information, one or more commands directing an internal device verification server to determine whether the first user device is one of a plurality of internal devices;
transmitting, via the communication interface and to the internal device verification server, the one or more commands to determine whether the first user device is the one of the plurality of internal devices;
receiving, via the communication interface and from the internal device verification server, internal device verification information indicating the first user device is the one of the plurality of internal devices;
in response to receiving the internal device verification information, identifying, based on the accessed account information, an action indicating the first user device accessed an account;
generating, based on the action and the accessed account information, one or more commands directing an external account authorization server to determine whether the action is authorized;
transmitting, via the communication interface and to the external account authorization server, the one or more commands directing the external account authorization server to determine whether the action is authorized;
receiving, via the communication interface and from the external account authorization server, information indicating unauthorized use of the account by the first user device;
transmitting, via the communication interface and to a case management server, the information indicating unauthorized access of the account by the first user device;
receiving, via the communication interface and from the case management server, updated unauthorized use information; and
updating unauthorized use criteria information based on the updated unauthorized use information received from the case management server.

20. One or more non-transitory computer-readable media storing instructions that, when executed by a computing platform comprising at least one processor, memory, and a communication interface, cause the computing platform to:
receive, via the communication interface and from a first user device, metadata comprising first user device identification information and accessed account information;
generate, based on the first user device identification information, one or more commands directing an internal device verification server to determine whether the first user device is one of a plurality of internal devices;
transmit, via the communication interface and to the internal device verification server, the one or more commands to determine whether the first user device is the one of the plurality of internal devices;
receive, via the communication interface and from the internal device verification server, internal device verification information indicating the first user device is the one of the plurality of internal devices;
in response to receiving the internal device verification information, identify, based on the accessed account information, an action indicating the first user device accessed an account;
generate, based on the action and the accessed account information, one or more commands directing an external account authorization server to determine whether the action is authorized;
transmit, via the communication interface and to the external account authorization server, the one or more commands directing the external account authorization server to determine whether the action is authorized;
receive, via the communication interface and from the external account authorization server, information indicating unauthorized use of the account by the first user device;
transmit, via the communication interface and to a case management server, the information indicating unauthorized use of the account by the first user device;

receive, via the communication interface and from the case management server, updated unauthorized use information; and update unauthorized use criteria information based on the updated unauthorized use information received from the case management server.

\* \* \* \* \*